United States Patent
Xia et al.

(10) Patent No.: US 11,223,541 B2
(45) Date of Patent: Jan. 11, 2022

(54) VIRTUAL NETWORK FUNCTION NETWORK ELEMENT MANAGEMENT METHOD, APPARATUS, AND SYSTEM

(71) Applicant: Huawei Technologies Co., Ltd., Shenzhen (CN)

(72) Inventors: Liang Xia, Nanjing (CN); Ning Zong, Nanjing (CN); Yang Wang, Nanjing (CN); Qin Wu, Nanjing (CN); Danhua Wang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 908 days.

(21) Appl. No.: 15/133,399

(22) Filed: Apr. 20, 2016

(65) Prior Publication Data

US 2016/0234082 A1    Aug. 11, 2016

Related U.S. Application Data

(63) Continuation of application No. PCT/CN2014/088444, filed on Oct. 13, 2014.

(30) Foreign Application Priority Data

Oct. 21, 2013  (CN) .................. 201310497085.4

(51) Int. Cl.
*H04L 12/24* (2006.01)
*G06F 9/455* (2018.01)

(52) U.S. Cl.
CPC ...... *H04L 41/5096* (2013.01); *G06F 9/45558* (2013.01); *H04L 41/0893* (2013.01); *G06F 2009/45595* (2013.01); *H04L 41/0663* (2013.01)

(58) Field of Classification Search
CPC .......... H04L 41/5096; H04L 41/0893; H04L 41/0663; G06F 9/45558; G06F 2009/45595
(Continued)

(56) References Cited

U.S. PATENT DOCUMENTS 6,085,238 A    7/2000  Yuasa et al.
2002/0055989 A1    5/2002  Stringer-Calvert et al.
(Continued)

FOREIGN PATENT DOCUMENTS

CN    1448017 A    10/2003
CN    1659539 A    8/2005
EP    1005195 A2    5/2000

OTHER PUBLICATIONS

Stewart and al. "Aggregate Server Access Protocol (ASAP) and Endpoint Handlespace Redundancy Protocol (ENRP) parameters", https://tools.ietf.org/html/rfc5354#page-12 (Year: 2008).*
(Continued)

*Primary Examiner* — James E Springer
*Assistant Examiner* — Patrick F Ngankam
(74) *Attorney, Agent, or Firm* — Slater Matsil, LLP

(57) ABSTRACT

The present invention provides a virtual network function network element management method, apparatus, and system. A VNF resource pool management apparatus receives a VNF network element request message sent by a VNF resource pool user apparatus, where the VNF network element request message includes attribute information and a location policy of a VNF network element that is requested; the VNF resource pool management apparatus determines a first VNF network element that matches the attribute information and the location policy from the VNF resource pool; and the VNF resource pool management apparatus sends a VNF network element response message
(Continued)

A VNF resource pool user apparatus sends a VNF network element request message to a VNF resource pool management apparatus — S201

The VNF resource pool user apparatus receives a VNF network element response message sent by the VNF resource pool management apparatus — S202

The VNF resource pool user apparatus determines the first VNF network element according to the VNF network element response message — S203 to the VNF resource pool user apparatus, where the VNF network element response message includes identification information of the first VNF network element. In this way, a risk that a functional group formed by VNF network elements cannot properly work can be avoided.

15 Claims, 7 Drawing Sheets

(58) Field of Classification Search
USPC .......................................................... 709/223
See application file for complete search history.

(56) References Cited

U.S. PATENT DOCUMENTS

| | | | |
|---|---|---|---|
| 2002/0069369 A1 | 6/2002 | Tremain | |
| 2003/0200295 A1* | 10/2003 | Roberts | H04L 41/12 709/223 |
| 2004/0151111 A1* | 8/2004 | Yarroll | H04L 67/1002 370/216 |
| 2006/0069946 A1* | 3/2006 | Krajewski, III | G06F 11/2028 714/4.1 |
| 2007/0160033 A1* | 7/2007 | Bozinovski | H04L 29/12066 370/352 |
| 2010/0290348 A1 | 11/2010 | Stanislaus et al. | |
| 2010/0309784 A1* | 12/2010 | Mihaly | H04L 29/12066 370/230 |
| 2012/0005276 A1 | 1/2012 | Guo et al. | |
| 2014/0192804 A1* | 7/2014 | Ghanwani | H04L 12/18 370/390 |
| 2016/0134472 A1* | 5/2016 | Guan | G06F 16/9537 709/222 |

OTHER PUBLICATIONS

Stewart and al. "Aggregate Server Access Protocol (ASAP) and Endpoint Handlespace Redundancy Protocol (ENRP) parameters", https://tools.ietf.org/html/rfc5354 (Year: 2008).*

Stewart and al. "Aggregate Server Access Protocol (ASAP) and Endpoint Handlespace Redundancy Protocol (ENRP) parameters", https://datatracker.ietf.org/doc/html/rfc5354 (Year: 2008).*

Lei, P. et al., "An Overview of Reliable Server Pooling Protocols," Network Working Group, Request for Comments: 5351, Category: Informational, Sep. 2008, 15 pages.

* cited by examiner

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
| Type = 0 x 01|0|0|0|0|0|0|0|           Message length         |
+-+-+-+-+-+-+-+-+-+-+-+-+-+-+-+-+-+-+-+-+-+-+-+-+-+-+-+-+-+-+-+-+
:               VNF resource pool handle parameter              :
+-+-+-+-+-+-+-+-+-+-+-+-+-+-+-+-+-+-+-+-+-+-+-+-+-+-+-+-+-+-+-+-+
:               VNF resource pool element parameter             :
+-+-+-+-+-+-+-+-+-+-+-+-+-+-+-+-+-+-+-+-+-+-+-+-+-+-+-+-+-+-+-+-+
|             VNF resource pool location information TLV        |
+-+-+-+-+-+-+-+-+-+-+-+-+-+-+-+-+-+-+-+-+-+-+-+-+-+-+-+-+-+-+-+-+
:                              ...                              :
+-+-+-+-+-+-+-+-+-+-+-+-+-+-+-+-+-+-+-+-+-+-+-+-+-+-+-+-+-+-+-+-+
:                              ...                              :
+-+-+-+-+-+-+-+-+-+-+-+-+-+-+-+-+-+-+-+-+-+-+-+-+-+-+-+-+-+-+-+-+
```

FIG. 6

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|    Type = "VNF_LOC_INFO"    |          Message length         |
+-+-+-+-+-+-+-+-+-+-+-+-+-+-+-+-+-+-+-+-+-+-+-+-+-+-+-+-+-+-+-+-+
:                           VM ID TLV                           :
+-+-+-+-+-+-+-+-+-+-+-+-+-+-+-+-+-+-+-+-+-+-+-+-+-+-+-+-+-+-+-+-+
:                              ...                              :
+-+-+-+-+-+-+-+-+-+-+-+-+-+-+-+-+-+-+-+-+-+-+-+-+-+-+-+-+-+-+-+-+
|                  Virtual machine hypervisor TLV               |
+-+-+-+-+-+-+-+-+-+-+-+-+-+-+-+-+-+-+-+-+-+-+-+-+-+-+-+-+-+-+-+-+
:                              ...                              :
+-+-+-+-+-+-+-+-+-+-+-+-+-+-+-+-+-+-+-+-+-+-+-+-+-+-+-+-+-+-+-+-+
:                      Server information TLV                  :
+-+-+-+-+-+-+-+-+-+-+-+-+-+-+-+-+-+-+-+-+-+-+-+-+-+-+-+-+-+-+-+-+
:                              ...                              :
+-+-+-+-+-+-+-+-+-+-+-+-+-+-+-+-+-+-+-+-+-+-+-+-+-+-+-+-+-+-+-+-+
```

FIG. 7

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|    Type = 0 x 05|0|0|0|0|0|0|0|S|        Message length       |
+-+-+-+-+-+-+-+-+-+-+-+-+-+-+-+-+-+-+-+-+-+-+-+-+-+-+-+-+-+-+-+-+
:              VNF resource pool handle parameter               :
+-+-+-+-+-+-+-+-+-+-+-+-+-+-+-+-+-+-+-+-+-+-+-+-+-+-+-+-+-+-+-+-+
|           Sequence relationship of VNF network elements       |
+-+-+-+-+-+-+-+-+-+-+-+-+-+-+-+-+-+-+-+-+-+-+-+-+-+-+-+-+-+-+-+-+
| Quantity of vFW network elements |     Attribute information  |
+-+-+-+-+-+-+-+-+-+-+-+-+-+-+-+-+-+-+-+-+-+-+-+-+-+-+-+-+-+-+-+-+
| Quantity of vLB network elements |     Attribute information  |
+-+-+-+-+-+-+-+-+-+-+-+-+-+-+-+-+-+-+-+-+-+-+-+-+-+-+-+-+-+-+-+-+
:     Type = "VNF_LOC_POLICY"      |      Information length    :
+-+-+-+-+-+-+-+-+-+-+-+-+-+-+-+-+-+-+-+-+-+-+-+-+-+-+-+-+-+-+-+-+
:                              ...                              :
+-+-+-+-+-+-+-+-+-+-+-+-+-+-+-+-+-+-+-+-+-+-+-+-+-+-+-+-+-+-+-+-+
```

FIG. 8

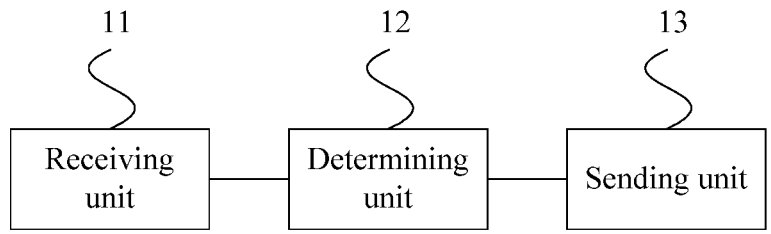

FIG. 9

VIRTUAL NETWORK FUNCTION NETWORK ELEMENT MANAGEMENT METHOD, APPARATUS, AND SYSTEM

This application is a continuation of International Application No. PCT/CN2014/088444, filed on Oct. 13, 2014, which claims priority to Chinese Patent Application No. 201310497085.4, filed on Oct. 21, 2013, both of which are hereby incorporated by reference in their entireties.

TECHNICAL FIELD

Embodiments relate to the field of communications technologies, and in particular, to a virtual network function network element management method, apparatus, and system.

BACKGROUND

At present, operators pay increasing attention to a virtual network function (VNF). The VNF includes virtualization of an L3 function and virtualization of L4-L7 functions, where the virtualization of the L3 function may include: a virtual provider edge (vPE), a virtual broadband network gateway (vBNG), a virtual data center gateway (vDC GW), and the like; and the virtualization of the L4-L7 functions may include: a virtual load balance (vLB) device, a virtual wide area network optimization controller (vWoC), a virtual firewall (vFW) device, and the like. As a software running instance, the VNF runs in a specific virtual environment on a specific server. FIG. 1 is a schematic diagram of a hierarchical implementation manner of a VNF in the prior art. As shown in FIG. 1, the VNF runs on a virtual machine (VM), the VM runs on a virtual machine hypervisor, the Hypervisor runs on a server, and a pool registrar (PR) manages the server based on the Reliable Server Pooling (RserPool) protocol. FIG. 2 is a schematic diagram of an architecture of the RserPool protocol in the prior art. As shown in FIG. 2, as a pool element (PE), a server is located in a server pool, and the pool registrar manages a corresponding server pool, where communication between the PE and the PR and communication between a pool user (PU) apparatus and the PR are both performed based on the Aggregate Server Access Protocol (ASAP), communication between an PR and an PR is performed based on the Endpoint Handlespace Redundancy Protocol (ENRP), and communication between the PU and a client and communication between the PU and the PE are both performed based on an application protocol.

At least two VNF network elements may be required to form a functional group, where the functional group may be a functional cluster or an active/standby group. The PU sends a request message to the PR, and the PR determines at least two VNF network elements according to a condition parameter carried in the request message, and then feeds back the determined at least two VNF network elements to the PU, so that the PU newly establishes a functional group according to the determined at least two VNF network elements.

However, if the at least two VNF network elements that form the functional group run on a same VM, a same Hypervisor, or a same server, when the VM, the Hypervisor, or the server is faulty (which is also referred to as a risk sharing issue), the functional group formed by these VNF network elements cannot properly work.

SUMMARY

Disclosed embodiments provide a virtual network function network element management method, apparatus, and system, so as to avoid a risk that a functional group formed by VNF network elements cannot properly work.

According to a first aspect, an embodiment provides a virtual network function network element management method, including: receiving, by a VNF resource pool management apparatus, a VNF network element request message sent by a VNF resource pool user apparatus, where the VNF network element request message includes attribute information and a location policy of a VNF network element that is requested; determining, by the VNF resource pool management apparatus according to the VNF network element request message and location information of VNF network elements in a VNF resource pool, a first VNF network element that matches the attribute information and the location policy from the VNF resource pool, where the first VNF network element includes at least one VNF network element; and sending, by the VNF resource pool management apparatus, a VNF network element response message to the VNF resource pool user apparatus, where the VNF network element response message includes identification information of the first VNF network element.

According to a second aspect, an embodiment provides a VNF resource pool management apparatus, including: a receiving unit, configured to receive a VNF network element request message sent by a VNF resource pool user apparatus, where the VNF network element request message includes attribute information and a location policy of a VNF network element that is requested; a determining unit, configured to determine, according to the VNF network element request message and location information of VNF network elements in a VNF resource pool, a first VNF network element that matches the attribute information and the location policy from the VNF resource pool, where the first VNF network element includes at least one VNF network element; and a sending unit, configured to send a VNF network element response message to the VNF resource pool user apparatus, where the VNF network element response message includes identification information of the first VNF network element.

According to a third aspect, an embodiment provides a VNF resource pool user apparatus, including: a sending unit, configured to send a VNF network element request message to a VNF resource pool management apparatus, where the VNF network element request message includes attribute information and a location policy of a VNF network element that is requested, so that the VNF resource pool management apparatus determines, according to the VNF network element request message and location information of VNF network elements in a VNF resource pool, a first VNF network element that matches the attribute information and the location policy from the VNF resource pool, where the first VNF network element includes at least one VNF network element; a receiving unit, configured to receive a VNF network element response message sent by the VNF resource pool management apparatus, where the VNF network element response message includes identification information of the first VNF network element; and a processing unit, configured to determine the first VNF network element according to the VNF network element response message.

According to a fourth aspect, an embodiment provides a VNF network element management system, including: a VNF network element, configured to send a registration message to a VNF resource pool management apparatus, where the registration message includes location information of the VNF network element; the VNF resource pool management apparatus, which is the VNF resource pool management apparatus provided in the second aspect of the embodiments, and communicatively connected to both the VNF network element and a VNF resource pool user apparatus; and the VNF resource pool user apparatus, which is the VNF resource pool user apparatus provided in the third aspect of the embodiments.

According to the virtual network function network element management method, apparatus, and system provided in the embodiments, a VNF resource pool management apparatus receives a VNF network element request message sent by a VNF resource pool user apparatus, and determines, according to the VNF network element request message and location information of VNF network elements in a VNF resource pool, a first VNF network element that matches attribute information and a location policy from the VNF resource pool, and the VNF resource pool management apparatus sends a VNF network element response message to the VNF resource pool user apparatus. Because the VNF resource pool management apparatus determines, according to the location policy and the location information of the VNF network elements, VNF network elements that are requested, all the determined VNF network elements can be deployed on different VMs, different Hypervisors, or different servers, which can avoid a risk that a functional group formed by VNF network elements cannot properly work.

BRIEF DESCRIPTION OF THE DRAWINGS

To describe the technical solutions in the embodiments or in the prior art more clearly, the following briefly introduces the accompanying drawings required for describing the embodiments or the prior art.

FIG. 6 is a schematic diagram of a format of an extended ASAP registration packet according to an embodiment;

FIG. 7 is a schematic diagram of a format of a first TLV field according to an embodiment;

FIG. 8 is a schematic diagram of a format of an extended ASAP handle resolution packet according to an embodiment;

FIG. 9 is a schematic structural diagram of Embodiment 1 of a VNF resource pool management apparatus according to the present invention;

DETAILED DESCRIPTION OF ILLUSTRATIVE EMBODIMENTS

The following describes the embodiments with reference to the accompanying drawings.

Figure 1:
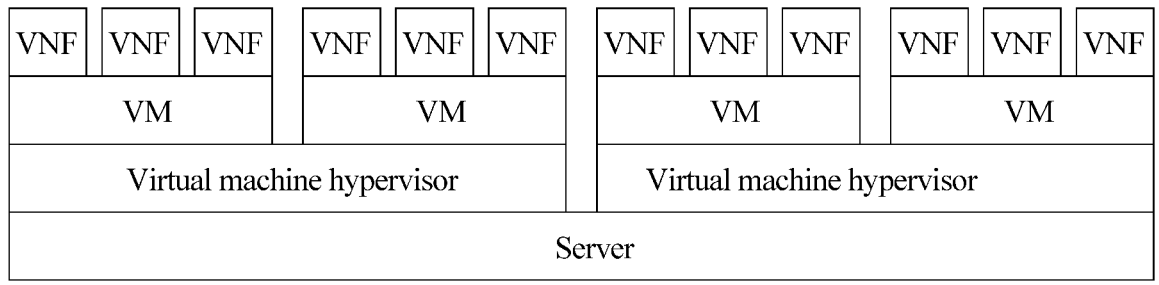
FIG. 1 is a schematic diagram of a hierarchical implementation manner of a VNF in the prior art.
Figure 2:
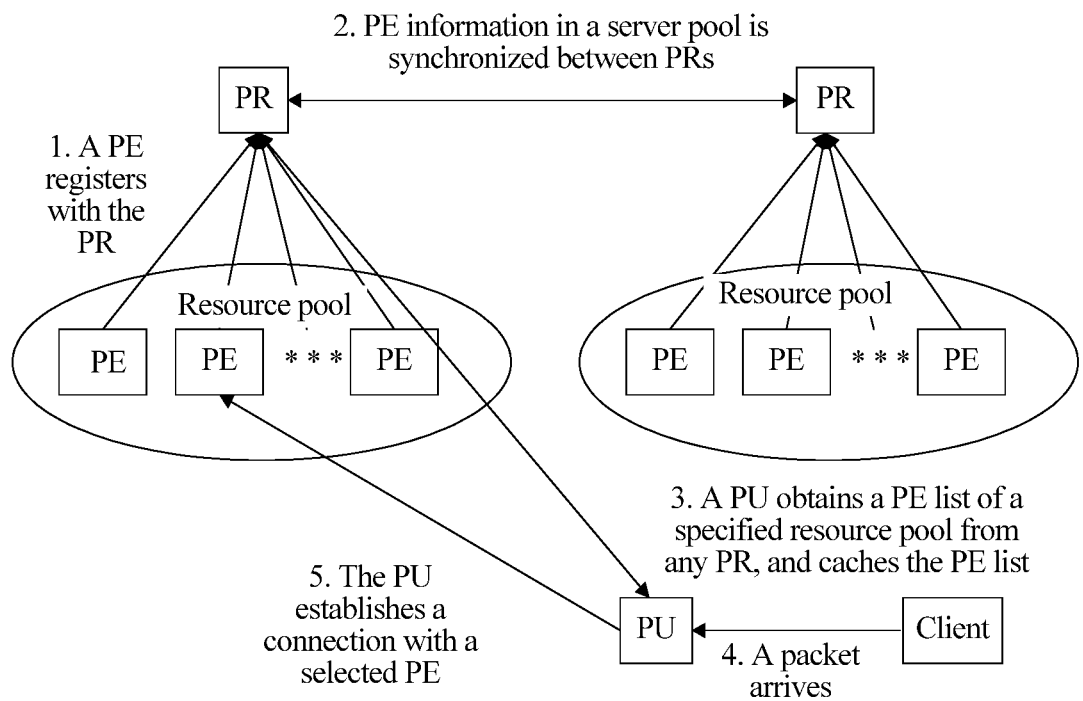
FIG. 2 is a schematic diagram of an architecture of the RserPool protocol in the prior art.
Figure 3:
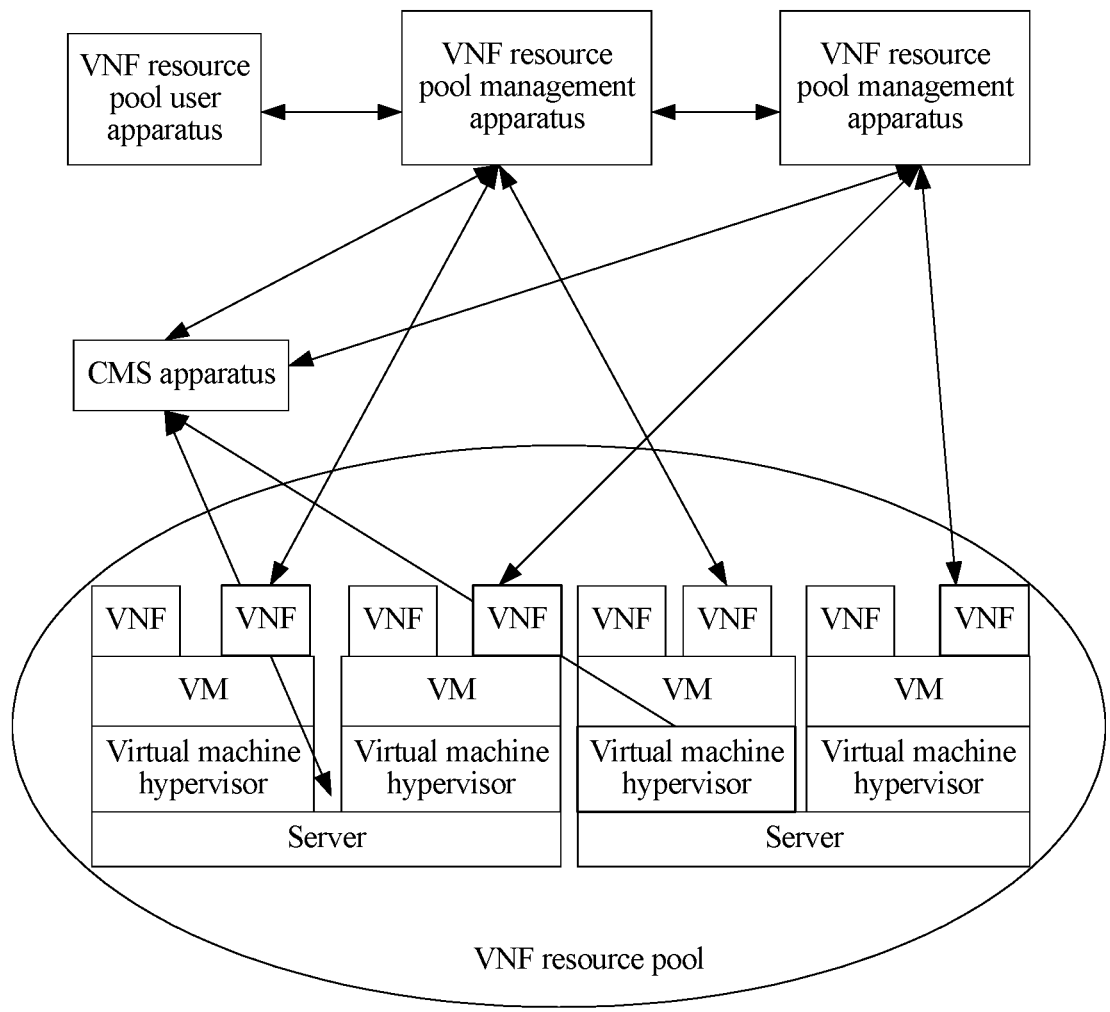
FIG. 3 is a schematic diagram of an application scenario of a virtual network function network element management method according to an embodiment.

FIG. 3 is a schematic diagram of an application scenario of a virtual network function network element management method according to an embodiment. As shown in FIG. 3, a cloud management system (CMS) apparatus can create a VNF network element, where VNF resource pool management is performed on all created VNF network elements, that is, all VNF network elements are placed in a resource pool as available resources, and a VNF resource pool management apparatus allocates, according to specific requirements of different services, VNF network elements from the VNF resource pool, for a VNF resource pool user apparatus to use, where communication between the CMS apparatus and the VNF resource pool may be performed based on a cloud computing management protocol, communication between the VNF resource pool management apparatus and the CMS apparatus may be performed based on a cloud management system query protocol, communication between the VNF resource pool management apparatus and the VNF resource pool user apparatus and communication between the VNF resource pool management apparatus and a VNF network element in the VNF resource pool may be both performed based on an extended ASAP, and communication between a VNF resource pool management apparatus and a VNF resource pool management apparatus may be performed based on an extended ENRP. The VNF resource pool management apparatus supports a distributed architecture to implement load sharing and improve reliability. Operations such as synchronization of information about a VNF resource pool management apparatus and synchronization of update, fault detection between VNF resource pool management apparatuses, and replacement of a failed VNF resource pool management apparatus are performed between all VNF resource pool management apparatuses by using the ENRP. Finally, overall availability and consistency of a cluster of the VNF resource pool management apparatuses are maintained. The application scenario shown in FIG. 3 is an application scenario of an embodiment of a virtual network function network element management method according to the present invention, to which the embodiments are not limited.

Figure 4:
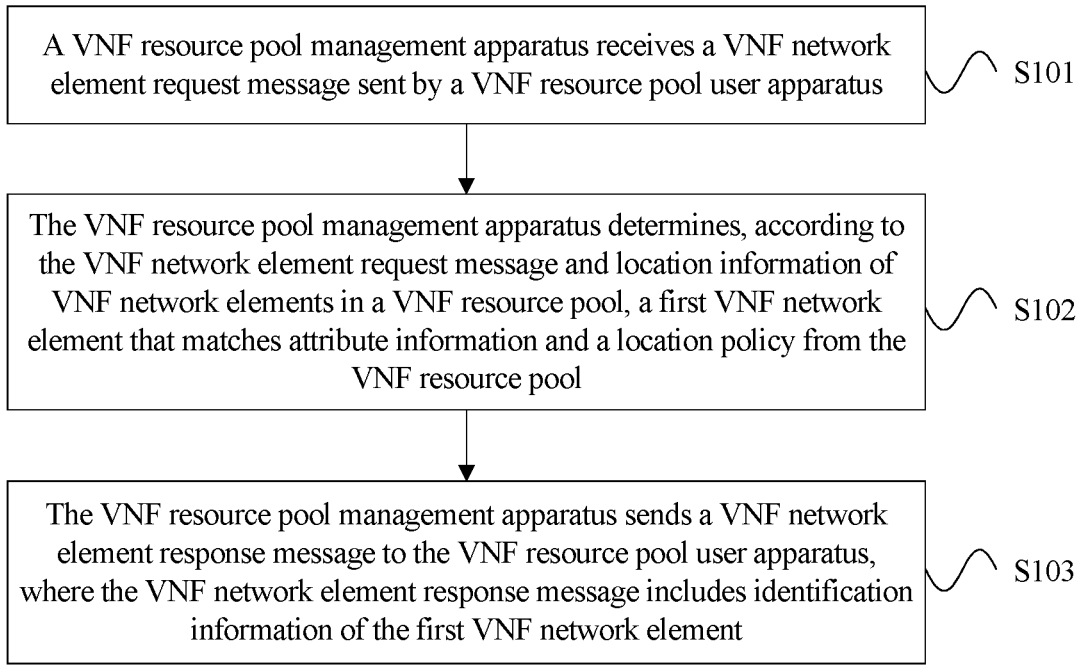
FIG. 4 is a flowchart of Embodiment 1 of a virtual network function network element management method according to the present invention.

FIG. 4 is a flowchart of Embodiment 1 of a virtual network function network element management method according to the present invention. As shown in FIG. 4, the method in this embodiment may include the following steps:

S101. A VNF resource pool management apparatus receives a VNF network element request message sent by a VNF resource pool user apparatus.

In this embodiment, the VNF network element request message includes attribute information and a location policy of a VNF network element that is requested. VNF resource pool management is performed on all VNF network elements, that is, all VNF network elements are placed in a resource pool as available resources. VNF network elements are allocated from the VNF resource pool according to specific requirements of different services for use. The VNF resource pool management apparatus may be a management server, and the VNF resource pool user apparatus may be a network management system (NMS) server or an operation support system (OSS) server.

The VNF resource pool management apparatus may receive the VNF network element request message sent by the VNF resource pool user apparatus, for example, when a functional group needs to be newly established or updated, the functional group may be a functional cluster in the prior art or an active/standby group in the prior art. The VNF resource pool user apparatus may send the VNF network element request message to the VNF resource pool management apparatus, where the VNF network element request message includes the attribute information of the VNF network element that is requested and the location policy of the VNF network element that is requested, and the attribute information of the VNF network element that is requested may be a name of the VNF network element, a type of the VNF network element (such as vFW, vWoC, vLB, or vDPI), a central processing unit (CPU) of the VNF network element, memory of the VNF network element, storage space of the VNF network element, bandwidth of the VNF network element, an interface of the VNF network element, and the like. The location policy of the VNF network element that is requested is used to indicate a location relationship of the VNF network element that is requested.

S102. The VNF resource pool management apparatus determines, according to the VNF network element request message and location information of VNF network elements in a VNF resource pool, a first VNF network element that matches attribute information and a location policy from the VNF resource pool.

In this embodiment, after receiving the VNF network element request message sent by the VNF resource pool user apparatus, the VNF resource pool management apparatus determines, according to the VNF network element request message and location information of all VNF network elements in the VNF resource pool, the first VNF network element from the VNF resource pool, where the first VNF network element matches the attribute information and the location policy in the VNF network element request message. For example, location information of a VNF network element may be: the VNF network element is deployed on which server, on which virtual machine hypervisor, or on which VM. The first VNF network element includes at least one VNF network element, that is, the VNF resource pool management apparatus may determine at least one VNF network element that matches the attribute information and the location policy from the VNF resource pool. For example, the location policy is used to indicate that all VNF network elements that are requested are deployed on different servers, or all VNF network elements that are requested are deployed on different VMs, or all VNF network elements that are requested are deployed on different virtual machine hypervisors.

S103. The VNF resource pool management apparatus sends a VNF network element response message to the VNF resource pool user apparatus, where the VNF network element response message includes identification information of the first VNF network element.

In this embodiment, after the VNF resource pool determines the first VNF network element, the VNF resource pool management apparatus sends the VNF network element response message to the VNF resource pool user apparatus, where the VNF network element response message includes the identification information of the first VNF network element, that is, the VNF network element response message includes identification information of each VNF network element determined in S102. The VNF resource pool user apparatus can determine the first VNF network element according to the identification information of the first VNF network element, that is, the VNF resource pool user apparatus can determine, according to the identification information of each VNF network element determined in the foregoing, each VNF network element determined in the foregoing. Therefore, location deployment of VNF network elements with different degrees of reliability can be flexibly implemented, avoiding a problem that a functional cluster or an active/standby group formed by the VNF network elements fails when a lower-layer physical device or logical module of a VNF network element is faulty.

According to the virtual network function network element management method provided in Embodiment 1, a VNF resource pool management apparatus receives a VNF network element request message sent by a VNF resource pool user apparatus, and determines, according to the VNF network element request message and location information of VNF network elements in a VNF resource pool, a first VNF network element that matches attribute information and a location policy from the VNF resource pool, and the VNF resource pool management apparatus sends a VNF network element response message to the VNF resource pool user apparatus. Because the VNF resource pool management apparatus determines, according to the location policy and the location information of the VNF network elements, VNF network elements that are requested, all the determined VNF network elements can be deployed on different VMs, different Hypervisors, or different servers, which can avoid a risk that a functional group formed by VNF network elements cannot properly work.

Figure 5:
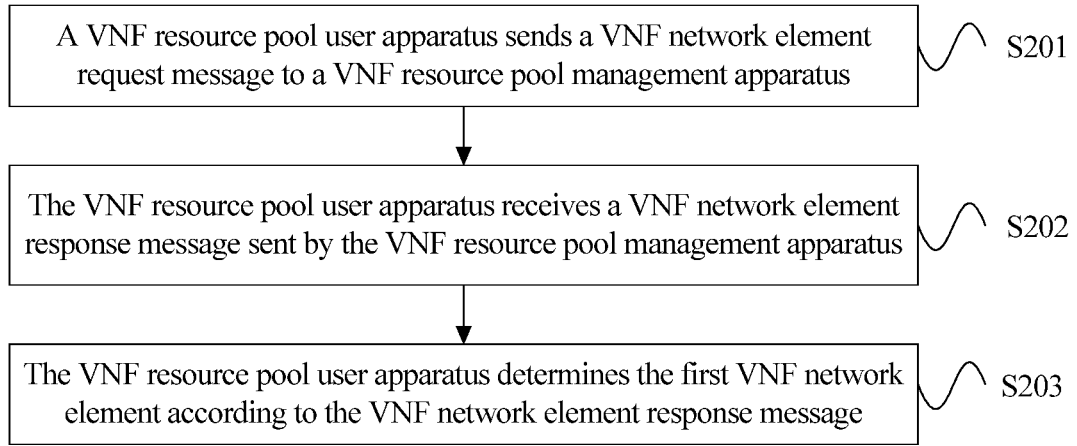
FIG. 5 is a flowchart of Embodiment 2 of a virtual network function network element management method according to the present invention.

FIG. 5 is a flowchart of Embodiment 2 of a virtual network function network element management method according to the present invention. As shown in FIG. 5, the method in this embodiment may include the following steps:

S201. A VNF resource pool user apparatus sends a VNF network element request message to a VNF resource pool management apparatus.

In this embodiment, the VNF resource pool user apparatus may send the VNF network element request message to the VNF resource pool management apparatus, for example, when a functional group needs to be newly established or updated, the functional group may be a functional cluster in the prior art or an active/standby group in the prior art. The VNF resource pool user apparatus may send the VNF network element request message to the VNF resource pool management apparatus, where the VNF network element request message includes attribute information of a VNF network element that is requested and a location policy of the VNF network element that is requested, and the location policy of the VNF network element that is requested is used to indicate a location relationship of the VNF network element that is requested. In this way, the VNF resource pool management apparatus can determine, according to the VNF network element request message and location information of VNF network elements in a VNF resource pool, a first VNF network element that matches the attribute information and the location policy from the VNF resource pool, where the first VNF network element includes at least one VNF network element.

S202. The VNF resource pool user apparatus receives a VNF network element response message sent by the VNF resource pool management apparatus.

In this embodiment, after determining, according to the VNF network element request message and location information of the VNF network elements in the VNF resource pool, the first VNF network element that matches the attribute information and the location policy from the VNF resource pool, the VNF resource pool management apparatus sends the VNF network element response message to the VNF resource pool user apparatus, where the VNF network element response message includes identification information of the first VNF network element. The VNF resource pool user apparatus may receive the VNF network element response message sent by the VNF resource pool management apparatus.

S203. The VNF resource pool user apparatus determines the first VNF network element according to the VNF network element response message.

In this embodiment, the VNF resource pool user apparatus may acquire the identification information of the first VNF network element according to the VNF network element response message, and then determine the first VNF network element according to the identification information, that is, the VNF resource pool user apparatus may determine identification information of at least one VNF network element, and then determine the at least one VNF network element according to the identification information of the at least one VNF network element. For example, the VNF resource pool user apparatus may determine to newly establish the first VNF network element or update a functional group, or the VNF resource pool user apparatus may control a traffic steering device to deliver a flow to the first VNF, or the VNF resource pool user apparatus may arrange the first VNF network element according to a service requirement of a service of the VNF resource pool user apparatus.

According to the virtual network function network element management method provided in Embodiment 2, a VNF resource pool user apparatus sends a VNF network element request message to a VNF resource pool management apparatus, receives a VNF network element response message sent by the VNF resource pool management apparatus, and determines a first VNF network element according to the VNF network element response message. Because VNF network elements are determined by the VNF resource pool management apparatus according to a location policy and location information of the VNF network elements, all the determined VNF network elements can be deployed on different VMs, different Hypervisors, or different servers, which can avoid a risk that a functional group formed by VNF network elements cannot properly work.

In Embodiment 3 of a virtual network function network element management method according to the present invention, on the basis of Embodiment 1 of the virtual network function network element management method according to the present invention or Embodiment 2 of the virtual network function network element management method according to the present invention, the identification information of the first VNF network element is an Internet Protocol (IP) address or a media access control (MAC) address of the first VNF network element.

In Embodiment 4 of a virtual network function network element management method according to the present invention, on the basis of any embodiment of Embodiment 1 to Embodiment 3 of the virtual network function network element management methods according to the present invention, that the foregoing VNF resource pool management apparatus determines, according to the VNF network element request message and location information of the VNF network elements in the VNF resource pool, the first VNF network element that matches the attribute information and the location policy from the VNF resource pool includes: determining, by the VNF resource pool management apparatus according to the attribute information in the VNF network element request message, a second VNF network element that matches the attribute information from the VNF resource pool; acquiring, by the VNF resource pool management apparatus, location information of the second VNF network element; and determining, by the VNF resource pool management apparatus according to the location information of the second VNF network element and the location policy in the VNF network element request message, the first VNF network element that matches the location policy from the second VNF network element.

In a first possible implementation manner, that the foregoing VNF resource pool management apparatus determines, according to the VNF network element request message and the location information of the VNF network elements in the VNF resource pool, the first VNF network element that matches the attribute information and the location policy from the VNF resource pool includes: determining, by the VNF resource pool management apparatus according to the attribute information in the VNF network element request message, a second VNF network element that matches the attribute information from the VNF resource pool; acquiring, by the VNF resource pool management apparatus, location information of the second VNF network element from a cloud management system apparatus, where the cloud management system apparatus stores location information of a VNF network element in the VNF resource pool; and determining, by the VNF resource pool management apparatus according to the location information of the second VNF network element and the location policy in the VNF network element request message, the first VNF network element that matches the location policy from the second VNF network element.

In this embodiment, the cloud management system apparatus may create all VNF network elements in the VNF resource pool, and allocate corresponding functions to the created VNF network elements, that is, the cloud management system apparatus allocates attribute information to the VNF network elements. For example, some VNF network elements created by the cloud management system apparatus may be vFW network elements, and some VNF network elements may be vLB network elements, that is, the cloud management system apparatus allocates the attribute information to the VNF network elements, and the cloud management system apparatus further stores the location information of the VNF network element in the VNF resource pool. Optionally, location information of a VNF network element includes: an IP address and a MAC address of a server on which the VNF network element is located, an identifier of a virtual machine hypervisor on which the VNF network element is located, and an identifier of a VM on which the VNF network element is located. For example, the identifier of the virtual machine hypervisor on which the VNF network element is located may be a name, a number (such as a string of digits), or an IP address of the virtual machine hypervisor on which the VNF network element is located, and the identifier of the VM on which the VNF network element is located may be a name, a number (such as a string of digits), or an IP address of the VM on which the VNF network element is located. Further, the location information of the VNF network element may further include a virtual board slot number of the VNF network element. After receiving the VNF network element request message sent by the VNF resource pool user apparatus, the VNF resource pool management apparatus may determine, according to the attribute information in the VNF network element request message, the second VNF network element that matches the attribute information from the VNF resource pool. For example, if the attribute information indicates that the VNF network element that is requested is a vFW network element, the VNF resource pool management apparatus may determine the second VNF network element from the VNF resource pool, such as three vFW network elements. Because the cloud management system apparatus stores the location information of the VNF network element in the VNF resource pool, the VNF resource pool management apparatus acquires the location information of the second VNF network element from the cloud management system apparatus, that is, the VNF resource pool management apparatus acquires location information of the foregoing three vFW network elements from the cloud management system apparatus, and then the VNF resource pool management apparatus determines, according to the location information of the second VNF network element and the location policy in the VNF network element request message, the first VNF network element that matches the location policy from the second VNF network element. For example, the location policy is that two vFW network elements that are requested are deployed on different servers. If two vFW network elements of the three vFW network elements are deployed on a same server, and one vFW is deployed on another server, the VNF resource pool management apparatus selects one vFW network element from the two vFW network elements deployed on the same server as the first VNF network element, and also uses the vFW network element deployed on the another server as the first VNF network element.

In a second possible implementation manner, before the VNF resource pool management apparatus receives the VNF network element request message sent by the VNF resource pool user apparatus, the method further includes: receiving, by the VNF resource pool management apparatus, location information sent by a VNF network element in the VNF resource pool. That the VNF resource pool management apparatus determines, according to the VNF network element request message and location information of VNF network elements in the VNF resource pool, the first VNF network element that matches the attribute information and the location policy from the VNF resource pool includes: determining, by the VNF resource pool management apparatus according to the attribute information in the VNF network element request message, a second VNF network element that matches the attribute information from the VNF resource pool; acquiring location information of the second VNF network element from the location information that is of the VNF network element in the VNF resource pool and that is stored on the VNF resource pool management apparatus, and determining, according to the location information of the second VNF network element and the location policy in the VNF network element request message, the first VNF network element that matches the location policy from the second VNF network element.

In this embodiment, after the VNF network element is created in the VNF resource pool, the VNF network element sends the location information of the VNF network element to the VNF resource pool management apparatus, where the location information of the VNF network element may include: an IP address and a MAC address of a server on which the VNF network element is located, an identifier of a virtual machine hypervisor on which the VNF is located, and an identifier of a VM on which the VNF network element is located. For example, the identifier of the virtual machine hypervisor on which the VNF network element is located may be a name or a number of the virtual machine hypervisor on which the VNF network element is located, and the identifier of the VM on which the VNF network element is located may be a name or a number of the VM on which the VNF network element is located. Further, the location information of the VNF network element may further include a virtual board slot number of the VNF network element. The VNF resource pool management apparatus can acquire and store the location information of the VNF network element. After receiving the VNF network element request message sent by the VNF resource pool user apparatus, the VNF resource pool management apparatus may determine, according to the attribute information in the VNF network element request message and the stored location information of the VNF network element in the VNF resource pool, the first VNF network element that matches the attribute information and the location policy from the VNF resource pool.

Optionally, that the VNF resource pool management apparatus receives the location information sent by the VNF network element in the VNF resource pool includes: receiving, by the VNF resource pool management apparatus, a registration message sent by a VNF network element in the VNF resource pool, where the registration message includes location information of the VNF network element, and after the VNF network element sends the registration message to the VNF resource pool management apparatus, a registered VNF network element may be an available part in the VNF resource pool. In this embodiment, after the VNF network element is created in the VNF resource pool, the VNF network element sends the registration message to the VNF resource pool management apparatus, where the registration message may include: a name of the VNF network element, a type of the VNF network element (such as vFW, vWoC, vLB, or vDPI), a CPU of the VNF network element, memory of the VNF network element, storage space of the VNF network element, bandwidth of the VNF network element, an interface of the VNF network element, and the like. The registration message may further include the location information of the VNF network element.

Optionally, the foregoing registration message is an extended ASAP registration packet or a preset registration packet, where the preset registration packet is another newly-defined registration packet, and the registration message includes: a virtual machine VM identifier type-length-value (TLV) field, a virtual machine hypervisor identifier TLV field, and a server identifier TLV field.

The registration message includes a first TLV field, where the first TLV field is used to indicate the location information of the VNF network element. FIG. 6 is a schematic diagram of a format of an extended ASAP registration packet according to an embodiment. As shown in FIG. 6, the extended ASAP registration packet provided in this embodiment is obtained by adding a location information TLV of a VNF network element to an ASAP registration (ASAP REGISTRATION) packet in the prior art.

Optionally, the first TLV field includes: a VM identifier TLV field, a virtual machine hypervisor identifier TLV field, and a server identifier TLV field. In this embodiment, the VM identifier, the virtual machine hypervisor identifier, and the server identifier jointly identify the location information of the VNF network element, where the server identifier may be server information, and the server information may be an IP address and a MAC address of the server. FIG. 7 is a schematic diagram of a format of a first TLV field according to an embodiment. As shown in FIG. 7, the first TLV field provided in this embodiment includes: a type (which is used to identify that an information type is the location information of the VNF network element, that is, VNF_LOC_INFO), a message length (Message Length), a VM identifier (ID) TLV, a virtual machine hypervisor ID TLV, and a server information TLV.

In Embodiment 5 of a virtual network function network element management method according to the present invention, on the basis of any embodiment of Embodiment 1 to Embodiment 4 of the virtual network function network element management methods according to the present invention, the VNF network element request message sent by the VNF resource pool user apparatus to the VNF resource pool management apparatus carries explicit location policy information, for example, when creation of a VNF network element of an active/standby group is requested, the explicit location policy information carried in the VNF request message may be that two active vFW network elements are on a Server1, corresponding two standby vFW network elements are on a Server2, and one vLB network element is on a Server3. Then, the VNF resource pool management apparatus may directly acquire the location policy according to the explicit location policy information in the VNF network element request message.

In Embodiment 6 of a virtual network function network element management method according to the present invention, on the basis of any embodiment of Embodiment 1 to Embodiment 4 of the virtual network function network element management methods according to the present invention, the VNF resource pool management apparatus and the VNF resource pool user apparatus store a location policy information base, where the location policy information base includes many location policies and corresponding identifiers of the location policies, and the location policy information base may be directly configured on the VNF resource pool management apparatus and the VNF resource pool user apparatus by using a network management system, or may be acquired by the VNF resource pool user apparatus that is notified by the VNF resource pool management apparatus by using a specific negotiation or announcement mechanism. In this case, the VNF resource pool user apparatus can determine a location policy, and then determine an identifier of the location policy; and the VNF network element request message sent to the VNF resource pool management apparatus includes the identifier of the location policy. The VNF resource pool management apparatus acquires the identifier of the location policy according to the VNF network element request message, and then acquires the location policy according to the identifier.

In Embodiment 7 of a virtual network function network element management method according to the present invention, on the basis of any embodiment of Embodiment 1 to Embodiment 6 of the virtual network function network element management methods according to the present invention, the VNF network element request message is an extended ASAP handle resolution packet or a preset request packet. The preset request packet is another newly-defined request packet. FIG. 8 is a schematic diagram of a format of an extended ASAP handle resolution packet according to an embodiment. As shown in FIG. 8, the extended ASAP handle resolution packet provided in this embodiment is obtained by adding a location policy of the VNF network element (VNF_LOC_POLICY) to an ASAP handle resolution (ASAP_HANDLE_RESLOUTION) packet in the prior art.

Further, the VNF network element request message in this embodiment includes a sequence relationship of VNF network elements. For example, as shown in FIG. 8, the sequence relationship of the VNF network elements is that: all VNF network elements are successively sorted as follows: a vFW, a virtual intrusion protection system (vIPS), a virtual Anti Virus (vAV) device, a virtual application security gateway (vASG), and other network elements. After the foregoing VNF resource pool management apparatus determines, according to the VNF network element request message and the location information of the VNF network elements in the VNF resource pool, the first VNF network element that matches the attribute information and the location policy from the VNF resource pool, the method may further include: sorting, by the VNF resource pool management apparatus, the first VNF network elements according to the sequence relationship of the VNF network elements. That the foregoing VNF resource pool management apparatus sends the VNF network element response message to the VNF resource pool user apparatus may include: sending, by the VNF resource pool management apparatus, a VNF network element response message that includes identification information of the sorted first VNF network elements to the VNF resource pool user apparatus. Correspondingly, that the VNF resource pool user apparatus receives the VNF network element response message sent by the VNF resource pool management apparatus includes: receiving, by the VNF resource pool user apparatus, a VNF network element response message that includes the identification information of the sorted first VNF network elements and that is sent by the VNF resource pool management apparatus.

In Embodiment 8 of a virtual network function network element management method according to the present invention, on the basis of any embodiment of Embodiment 1 to Embodiment 7 of the virtual network function network element management methods according to the present invention, the location policy includes first information and/or second information. The first information indicates that all VNF network elements in a functional cluster or an active/standby group are deployed on different servers, or all VNF network elements in a functional cluster or an active/standby group are deployed on different virtual machine hypervisors of a same server, or all VNF network elements in a functional cluster or an active/standby group are deployed on different VMs on a same virtual machine hypervisor of a same server. The second information indicates that all VNF network elements in a functional cluster or an active/standby group are allocated to a same IP subnet, or all VNF network elements in a functional cluster or an active/standby group are equally allocated to at least two IP subnets. In a first possible implementation manner, when one functional cluster formed by four VNF network elements needs to be created, the location policy of the VNF network element may be that the four VNF network elements are deployed on different virtual machine hypervisors. In a second possible implementation manner, when an active/standby VNF group formed by two VNF network elements needs to be created, the location policy of the VNF network element may be that the VNF network elements are deployed on a same IP subnet. In a third possible implementation manner, when one VNF network element needs to be added to a created functional cluster, the location policy of the VNF network element may be that all VNF network elements that form the functional cluster are deployed on different virtual machine hypervisors, or the newly added VNF network element cannot be deployed on some virtual machine hypervisors. In a fourth possible implementation manner, when the VNF network element needs to be dynamically migrated, the location policy of the VNF network element may be that the migrated VNF network element can neither be deployed on a virtual machine hypervisor on which a first preset VNF network element is located, nor deployed on a virtual machine hypervisor on which a second preset VNF network element is located, which can ensure that previous reliability configuration is still valid.

FIG. 9 is a schematic structural diagram of Embodiment 1 of a VNF resource pool management apparatus according to the present invention. As shown in FIG. 9, the apparatus in this embodiment may include: a receiving unit 11, a determining unit 12, and a sending unit 13, where the receiving unit 11 is configured to receive a VNF network element request message sent by a VNF resource pool user apparatus, where the VNF network element request message includes attribute information and a location policy of a VNF network element that is requested; the determining unit 12 is configured to determine, according to the VNF network element request message and location information of VNF network elements in a VNF resource pool, a first VNF network element that matches the attribute information and the location policy from the VNF resource pool, where the first VNF network element includes at least one VNF network element; and the sending unit 13 is configured to send a VNF network element response message to the VNF resource pool user apparatus, where the VNF network element response message includes identification information of the first VNF network element.

The apparatus in this embodiment may be configured to execute the technical solutions of the foregoing method embodiments, and implementation principles and technical effects thereof are similar. For details, reference may be made to related descriptions in the foregoing method embodiments, which are not described herein again.

In Embodiment 2 of a VNF resource pool management apparatus, the apparatus in this embodiment is on the basis of a structure of the apparatus shown in FIG. 9. Optionally, the determining unit 12 is specifically configured to determine, according to the attribute information in the VNF network element request message, a second VNF network element that matches the attribute information from the VNF resource pool; acquire location information of the second VNF network element; and determine, according to the location information of the second VNF network element and the location policy in the VNF network element request message, the first VNF network element that matches the location policy from the second VNF network element.

Optionally, the receiving unit 11 is further configured to receive, before receiving the VNF network element request message sent by the VNF resource pool user apparatus, a registration message sent by a VNF network element in the VNF resource pool, where the registration message includes location information of the VNF network element; the registration message is an extended Aggregate Server Access Protocol ASAP registration packet or a preset registration packet, and the registration message includes: a virtual machine VM identifier TLV field, a virtual machine hypervisor identifier TLV field, and a server identifier TLV field; and the VNF network element request message is an extended ASAP handle resolution packet or a preset request packet.

Optionally, the location policy includes first information and/or second information, where the first information indicates that all VNF network elements in a functional cluster or an active/standby group are deployed on different servers, or all VNF network elements in a functional cluster or an active/standby group are deployed on different virtual machine hypervisors of a same server, or all VNF network elements in a functional cluster or an active/standby group are deployed on different VMs on a same virtual machine hypervisor of a same server; and the second information indicates that all VNF network elements in a functional cluster or an active/standby group are allocated to a same IP subnet, or all VNF network elements in a functional cluster or an active/standby group are equally allocated to at least two IP subnets.

Optionally, location information of a VNF network element includes: an IP address and a MAC address of a server on which the VNF network element is located, an identifier of a virtual machine hypervisor on which the VNF network element is located, and an identifier of a VM on which the VNF network element is located.

The apparatus in this embodiment may be configured to execute the technical solutions of the foregoing method embodiments, and implementation principles and technical effects thereof are similar. For details, reference may be made to related descriptions in the foregoing method embodiments, which are not described herein again.

In terms of hardware implementation, the foregoing receiving unit 11 may be a receiver or a transceiver, the foregoing sending unit 13 may be a transmitter or a transceiver, and the receiving unit 11 and the sending unit 13 may be integrated to constitute a transceiver unit, which is a transceiver corresponding to the hardware implementation. The foregoing determining unit 12 may be built in or independent of a processor of a VNF resource pool management apparatus in a hardware form, or may be stored in a memory of a VNF resource pool management apparatus in a software form, so that the processor invokes and performs an operation corresponding to each of the foregoing units. The processor may be a CPU, a microprocessor, a single-chip microcomputer, or the like.

Figure 10:
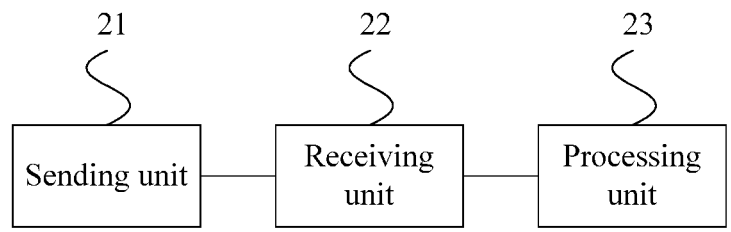
FIG. 10 is a schematic structural diagram of Embodiment 1 of a VNF resource pool user apparatus according to the present invention.

FIG. 10 is a schematic structural diagram of Embodiment 1 of a VNF resource pool user apparatus according to the present invention. As shown in FIG. 10, the apparatus in this embodiment may include: a sending unit 21, a receiving unit 22, and a processing unit 23, where the sending unit 21 is configured to send a VNF network element request message to a VNF resource pool management apparatus, where the VNF network element request message includes attribute information and a location policy of a VNF network element that is requested, so that the VNF resource pool management apparatus determines, according to the VNF network element request message and location information of VNF network elements in a VNF resource pool, a first VNF network element that matches the attribute information and the location policy from the VNF resource pool, where the first VNF network element includes at least one VNF network element; the receiving unit 22 is configured to receive a VNF network element response message sent by the VNF resource pool management apparatus, where the VNF network element response message includes identification information of the first VNF network element; and the processing unit 23 is configured to determine the first VNF network element according to the VNF network element response message.

The apparatus in this embodiment may be configured to execute the technical solutions of the foregoing method embodiments, and implementation principles and technical effects thereof are similar. For details, reference may be made to related descriptions in the foregoing method embodiments, which are not described herein again.

In Embodiment 2 of a VNF resource pool user apparatus according to the present invention, the apparatus in this embodiment is on the basis of a structure of the apparatus shown in FIG. 10. Optionally, the VNF network element request message is an extended Aggregate Server Access Protocol ASAP handle resolution packet or a preset request packet.

Optionally, the location policy includes first information and/or second information. The first information indicates that all VNF network elements in a functional cluster or an active/standby group are deployed on different servers, or all VNF network elements in a functional cluster or an active/standby group are deployed on different virtual machine hypervisors of a same server, or all VNF network elements in a functional cluster or an active/standby group are deployed on different virtual machines VMs on a same virtual machine of a same server.

The second information indicates that all VNF network elements in a functional cluster or an active/standby group are allocated to a same IP subnet, or all VNF network elements in a functional cluster or an active/standby group are equally allocated to at least two IP subnets.

Optionally, location information of a VNF network element includes: an IP address and a MAC address of a server on which the VNF network element is located, an identifier of a virtual machine hypervisor on which the VNF network element is located, and an identifier of a VM on which the VNF network element is located.

The apparatus in this embodiment may be configured to execute the technical solutions of the foregoing method embodiments, and implementation principles and technical effects thereof are similar. For details, reference may be made to related descriptions in the foregoing method embodiments, which are not described herein again.

In terms of hardware implementation, the foregoing sending unit 21 may be a transmitter or a transceiver, the foregoing receiving unit 22 may be a receiver or a transceiver, and the sending unit 21 and the receiving unit 22 may be integrated to constitute a transceiver unit, which is a transceiver corresponding to the hardware implementation. The foregoing processing unit 23 may be built in or independent of a processor of a VNF resource pool user apparatus in a hardware form, or may be stored in a memory of a VNF resource pool user apparatus in a software form, so that the processor invokes and performs an operation corresponding to each of the foregoing units. The processor may be a CPU, a microprocessor, a single-chip microcomputer, or the like.

Figure 11:
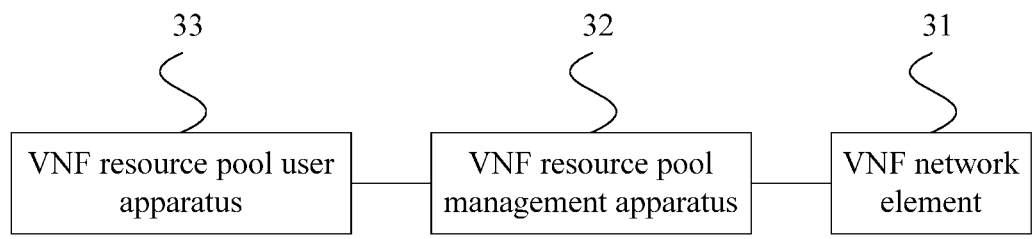
FIG. 11 is a schematic structural diagram of Embodiment 1 of a VNF network element management system according to the present invention.

FIG. 11 is a schematic structural diagram of Embodiment 1 of a VNF network element management system according to the present invention. As shown in FIG. 11, the VNF network element management system in this embodiment may include: a VNF network element 31, a VNF resource pool management apparatus 32, and a VNF resource pool user apparatus 33. The VNF network element 31 is configured to send a registration message to the VNF resource pool management apparatus, where the registration message includes location information of the VNF network element. The VNF resource pool management apparatus 32 is communicatively connected to both the VNF network element 31 and the VNF resource pool user apparatus 33, and the VNF resource pool management apparatus 32 may use a structure of the VNF resource pool management apparatus in Embodiment 1 or Embodiment 2. Correspondingly, the VNF resource pool management apparatus 32 may execute the technical solution in any method embodiment of the foregoing method embodiments, and implementation principles and technical effects thereof are similar, which are not described herein again. The VNF resource pool user apparatus 33 may use a structure of the VNF resource pool user apparatus in Embodiment 1 or Embodiment 2. Correspondingly, the VNF resource pool user apparatus 33 may execute the technical solution in any method embodiment of the foregoing method embodiments, and implementation principles and technical effects thereof are similar, which are not described herein again.

Figure 12:
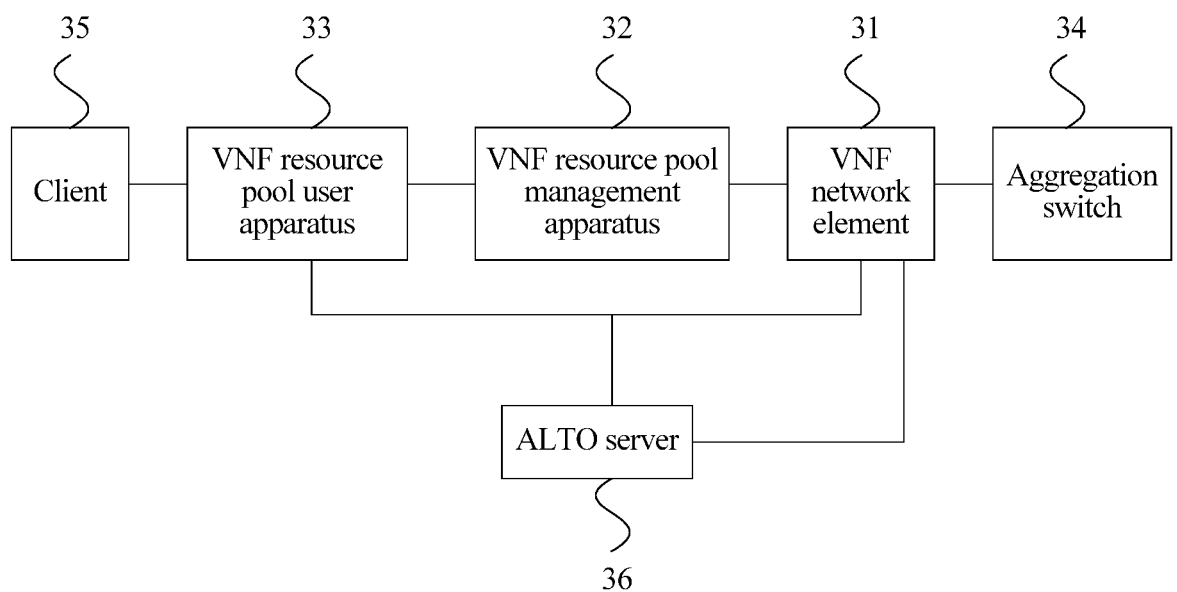
FIG. 12 is a schematic structural diagram of Embodiment 2 of a VNF network element management system according to the present invention.

FIG. 12 is a schematic structural diagram of Embodiment 2 of a VNF network element management system according to the present invention. As shown in FIG. 12, on the basis of the structure shown in FIG. 11, the system in this embodiment may further include: an aggregation switch 34. The foregoing VNF network element 31 is further configured to send, before sending the registration message to the VNF resource pool management apparatus 32, a binding message to the aggregation switch 34, so as to establish a binding relationship with the aggregation switch 34. The aggregation switch 34 is configured to receive the binding message sent by the VNF network element 31, so as to establish the binding relationship with the VNF network element, where the binding message includes a virtual board slot number of the VNF network element, and invoke, when a physical board of the aggregation switch is faulty, the VNF network element 31 according to the virtual board slot number to replace the physical board. In this embodiment, the VNF network element may be used as a virtual board, where the virtual board does not occupy a valuable slot resource, and has a similar function and performance as the physical board. For example, the aggregation switch has one physical board, and one VNF network element in the VNF resource pool is used as a virtual board to establish a binding relationship with the aggregation switch. The physical board reports a fault and a load situation to the aggregation switch by means of heartbeat detection. When finding that the physical board is faulty, the aggregation switch 34 may invoke the VNF network element 31 bound to the physical board, to replace the faulty physical board; or request a network management system to allocate a new virtual board, to establish a binding relationship with the aggregation switch 34 and replace the faulty physical board.

Figure 13:
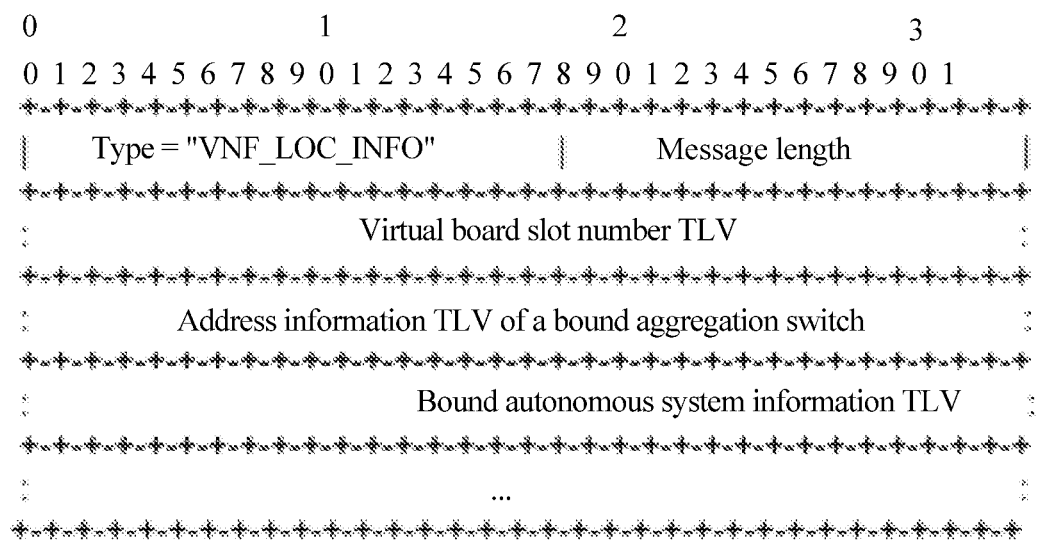
FIG. 13 is another schematic diagram of a format of an extended ASAP registration packet according to an embodiment.

Correspondingly, the registration message may further include: the virtual board slot number of the VNF network element and identification information of the aggregation switch that is bound to the VNF network element. FIG. 13 is another schematic diagram of a format of an extended ASAP registration packet according to an embodiment. As shown in FIG. 13, according to this embodiment, a location information TLV of a VNF network element is added on the basis of an ASAP registration (ASAP_REGISTRATION) packet in the prior art. FIG. 13 shows only the added location information TLV of the VNF network element, where the location information TLV of the VNF network element includes a virtual board slot number TLV of the VNF network element and an address information TLV of a bound aggregation switch. Specifically, the VNF network element may use the extended ASAP registration packet to update, to a VNF resource pool management apparatus, information about the bound aggregation switch after the VNF network element establishes a service chain, or preconfigured binding information of the VNF network element and the aggregation switch in a resource idle state, where the binding information is to be used subsequently when the VNF network element is switched due to a failure, the VNF network element is dynamically migrated, or the VNF network element establishes and updates a service chain.

Optionally, the management system in this embodiment may further include: a client 35 and an application layer traffic optimization (ALTO) server 36. The ALTO server 36 may further carry out a function of the VNF resource pool management apparatus 32, and is configured to acquire the registration information and location information of a VNF network element from the VNF network element 31. The client 35 may be configured to send a service request to the VNF resource pool user apparatus 33, where the service request may include a specified tenant, location, or area. For example, the service request is used to request to configure a virtual firewall cluster. The VNF resource pool user apparatus 33 may be further configured to query, from the ALTO server 36, a firewall cluster that matches service attribute information and VNF location information.

Persons of ordinary skill in the art may understand that all or some of the steps of the foregoing method embodiments may be implemented by a program instructing relevant hardware. The foregoing program may be stored in a computer-readable storage medium. When the program runs, the steps of the foregoing method embodiments are performed. The foregoing storage medium includes: any medium that can store program code, such as a ROM, a RAM, a magnetic disk, or an optical disc.

Finally, it should be noted that the foregoing embodiments are merely intended for illustration, but not for limiting the present invention. Although the present embodiments are described in detail, persons of ordinary skill in the art should understand that they may still make modifications to the technical solutions described in the foregoing embodiments or make equivalent replacements to some or all technical features thereof; however, these modifications or replacements do not make the essence of corresponding technical solutions depart from the scope of the technical solutions in the embodiments.

What is claimed is:

1. A virtual network function (VNF) network element management method, comprising:
    receiving, by a VNF resource pool management apparatus, a VNF network element request message sent by a VNF resource pool user apparatus, wherein the VNF network element request message comprises attribute information and a location policy, wherein the attribute information and the location policy are used to select a VNF network element, wherein the attribute information comprises at least one of a type of the VNF network element, storage space of the VNF network element, or bandwidth of the VNF network element, and wherein the location policy indicates a location relationship of the VNF network element;
    determining, by the VNF resource pool management apparatus according to the VNF network element request message and location information of VNF network elements in a VNF resource pool, a first VNF network element that matches the attribute information and the location policy from the VNF resource pool, wherein the first VNF network element comprises at least one VNF network element; and
    sending, by the VNF resource pool management apparatus, a VNF network element response message to the VNF resource pool user apparatus, wherein the VNF network element response message comprises identification information of the first VNF network element.

2. The method according to claim 1, wherein the determining the first VNF network element that matches the attribute information and the location policy from the VNF resource pool comprises:
    determining, by the VNF resource pool management apparatus according to the attribute information in the VNF network element request message, a second VNF network element that matches the attribute information from the VNF resource pool;
    acquiring, by the VNF resource pool management apparatus, location information of the second VNF network element; and
    determining, by the VNF resource pool management apparatus according to the location information of the second VNF network element and the location policy in the VNF network element request message, the first VNF network element that matches the location policy from the second VNF network element.

3. The method according to claim 2, wherein the method further comprises performing, before the receiving the VNF network element request message sent by the VNF resource pool user apparatus:
    receiving, by the VNF resource pool management apparatus, a registration message sent by a VNF network element in the VNF resource pool, wherein the registration message comprises location information of the VNF network element;
    wherein the registration message is an extended Aggregate Server Access Protocol (ASAP) registration packet or a preset registration packet, and the registration message comprises a virtual machine (VM) identifier type-length-value (TLV) field, a virtual machine hypervisor identifier TLV field, and a server identifier TLV field; and
    wherein the VNF network element request message is one of an extended ASAP handle resolution packet or a preset request packet.

4. The method according to claim 1, wherein the method further comprises performing, before the receiving the VNF network element request message sent by the VNF resource pool user apparatus:
    receiving, by the VNF resource pool management apparatus, a registration message sent by a VNF network element in the VNF resource pool, wherein the registration message comprises location information of the VNF network element;
    wherein the registration message is an extended Aggregate Server Access Protocol (ASAP) registration packet or a preset registration packet, and the registration message comprises a virtual machine (VM) identifier type-length-value (TLV) field, a virtual machine hypervisor identifier TLV field, and a server identifier TLV field; and
    wherein the VNF network element request message is an extended ASAP handle resolution packet or a preset request packet.

5. The method according to claim 1, wherein the location policy comprises at least one of first information and second information;
    wherein the first information indicates that at least one of all VNF network elements in one of a functional cluster and an active/standby group are deployed on different servers, or all VNF network elements in one of a functional cluster and an active/standby group are deployed on different virtual machine hypervisors of a same server, or all VNF network elements in one of a functional cluster and an active/standby group are deployed on different virtual machines (VMs) on a same virtual machine hypervisor of a same server; and
    wherein the second information indicates that at least one of all VNF network elements in one of a functional cluster and an active/standby group are allocated to a same Internet Protocol (IP) subnet, or all VNF network elements in one of a functional cluster and an active/standby group are equally allocated to at least two IP subnets.

6. The method according to claim 1, wherein the location information of the VNF network element comprises an Internet Protocol (IP) address and a media access control (MAC) address of a server on which the VNF network element is located, an identifier of a virtual machine hypervisor on which the VNF network element is located, and an identifier of a VM on which the VNF network element is located.

7. A virtual network function (VNF) resource pool management apparatus, comprising:
  a receiving unit, configured to receive a VNF network element request message sent by a VNF resource pool user apparatus, wherein the VNF network element request message comprises attribute information and a location policy, wherein the attribute information and the location policy are used to select a VNF network element, wherein the attribute information comprises at least one of a type of the VNF network element, storage space of the VNF network element, or bandwidth of the VNF network element, and wherein the location policy indicates a location relationship of the VNF network element;
  a processor;
  a non-transitory computer-readable storage medium storing a program to be executed by the processor, the program including instructions to:
    determine, according to the VNF network element request message and location information of VNF network elements in a VNF resource pool, a first VNF network element that matches the attribute information and the location policy from the VNF resource pool, wherein the first VNF network element comprises at least one VNF network element; and
  a sending unit, configured to send a VNF network element response message to the VNF resource pool user apparatus, wherein the VNF network element response message comprises identification information of the first VNF network element.

8. The apparatus according to claim 7, wherein the program further includes instructions to:
  determine, according to the attribute information in the VNF network element request message, a second VNF network element that matches the attribute information from the VNF resource pool;
  acquire location information of the second VNF network element; and
  determine, according to the location information of the second VNF network element and the location policy in the VNF network element request message, the first VNF network element that matches the location policy from the second VNF network element.

9. The apparatus according to claim 8, wherein the receiving unit is further configured to receive, before receiving the VNF network element request message sent by the VNF resource pool user apparatus, a registration message sent by a VNF network element in the VNF resource pool, wherein the registration message comprises location information of the VNF network element;
  wherein the registration message is one of an extended Aggregate Server Access Protocol (ASAP) registration packet or a preset registration packet, and wherein the registration message comprises a virtual machine (VM) identifier type-length-value (TLV) field, a virtual machine hypervisor identifier TLV field, and a server identifier TLV field; and
  wherein the VNF network element request message is one of an extended ASAP handle resolution packet or a preset request packet.

10. The apparatus according to claim 7, wherein the receiving unit is further configured to receive, before receiving the VNF network element request message sent by the VNF resource pool user apparatus, a registration message sent by a VNF network element in the VNF resource pool, wherein the registration message comprises location information of the VNF network element;
  wherein the registration message is one of an extended Aggregate Server Access Protocol (ASAP) registration packet or a preset registration packet, and wherein the registration message comprises a virtual machine (VM) identifier type-length-value (TLV) field, a virtual machine hypervisor identifier TLV field, and a server identifier TLV field; and
  wherein the VNF network element request message is one of an extended ASAP handle resolution packet or a preset request packet.

11. The apparatus according to claim 7, wherein the location policy comprises at least one of first information and second information;
  wherein the first information indicates that at least one of all VNF network elements in one of a functional cluster and an active/standby group are deployed on different servers, or all VNF network elements in one of a functional cluster and an active/standby group are deployed on different virtual machine hypervisors of a same server, or all VNF network elements in one of a functional cluster and an active/standby group are deployed on different virtual machines (VMs) on a same virtual machine hypervisor of a same server; and
  wherein the second information indicates that all VNF network elements in one of a functional cluster and an active/standby group are allocated to a same Internet Protocol (IP) subnet, or all VNF network elements in one of a functional cluster and an active/standby group are equally allocated to at least two IP subnets.

12. The apparatus according to claim 7, wherein location information of a VNF network element comprises an Internet Protocol (IP) address and a media access control (MAC) address of a server on which the VNF network element is located, an identifier of a virtual machine hypervisor on which the VNF network element is located, and an identifier of a VM on which the VNF network element is located.

13. A virtual network function (VNF) resource pool user apparatus, comprising:
  a sending unit, configured to send a VNF network element request message to a VNF resource pool management apparatus, wherein the VNF network element request message comprises attribute information and a location policy, wherein the attribute information and the location policy are used to select a VNF network element; the attribute information comprises at least one of: a type of the VNF network element, storage space of the VNF network element, or bandwidth of the VNF network element; the location policy is used to indicate a location relationship of the VNF network element, wherein the VNF network element request message causes the VNF resource pool management apparatus to determine, according to the VNF network element request message and location information of VNF network elements in a VNF resource pool, a first VNF network element that matches the attribute information and the location policy from the VNF resource pool, wherein the first VNF network element comprises at least one VNF network element;

a receiving unit, configured to receive a VNF network element response message sent by the VNF resource pool management apparatus, wherein the VNF network element response message comprises identification information of a first VNF network element, wherein the first VNF network element is selected from a VNF resource pool according to the attribute information and the location policy, and wherein the first VNF network element comprises at least one VNF network element;

a processor; and a non-transitory computer-readable storage medium storing a program to be executed by the processor, the program including instructions to:
determine the first VNF network element according to the VNF network element response message.

14. The apparatus according to claim 13, wherein the location policy comprises at least one of first information and second information;
wherein the first information indicates that at least one of all VNF network elements in one of a functional cluster and an active/standby group are deployed on different servers, or all VNF network elements in one of a functional cluster and an active/standby group are deployed on different virtual machine hypervisors of a same server, or all VNF network elements in one of a functional cluster and an active/standby group are deployed on different virtual machines (VMs) on a same virtual machine hypervisor of a same server; and
wherein the second information indicates that at least one of all VNF network elements in one of a functional cluster and an active/standby group are allocated to a same Internet Protocol (IP) subnet, or all VNF network elements in one of a functional cluster and an active/standby group are equally allocated to at least two IP subnets.

15. The apparatus according to claim 13, wherein the location information of the VNF network element comprises an Internet Protocol (IP) address and a media access control (MAC) address of a server on which the VNF network element is located, an identifier of a virtual machine hypervisor on which the VNF network element is located, and an identifier of a VM on which the VNF network element is located.

* * * * *